(12) United States Patent
Lin et al.

(10) Patent No.: US 11,297,175 B2
(45) Date of Patent: Apr. 5, 2022

(54) CAMERA AND TERMINAL

(71) Applicant: HUAWEI TECHNOLOGIES CO., LTD., Guangdong (CN)

(72) Inventors: Weichih Lin, Dongguan (CN); Zhe Peng, Dongguan (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/280,363

(22) PCT Filed: Sep. 27, 2018

(86) PCT No.: PCT/CN2018/108020
§ 371 (c)(1),
(2) Date: Mar. 26, 2021

(87) PCT Pub. No.: WO2020/061925
PCT Pub. Date: Apr. 2, 2020

(65) Prior Publication Data
US 2021/0274029 A1    Sep. 2, 2021

(51) Int. Cl.
*G02B 7/02* (2021.01)
*H04M 1/02* (2006.01)
(Continued)

(52) U.S. Cl.
CPC .......... *H04M 1/0264* (2013.01); *G02B 5/003* (2013.01); *G02B 7/021* (2013.01); *G02B 7/022* (2013.01);
(Continued)

(58) Field of Classification Search
CPC .......... G02B 5/003; G02B 5/00; G02B 7/021; G02B 7/02; G02B 7/022; G02B 7/00;
(Continued)

(56) References Cited

U.S. PATENT DOCUMENTS

2006/0087749 A1    4/2006  Saito
2013/0077183 A1*   3/2013  An ........................ G02B 7/022
                                                      359/819
(Continued)

FOREIGN PATENT DOCUMENTS

CN            1837942 A      9/2006
CN          100468187 C      3/2009
(Continued)

*Primary Examiner* — William R Alexander
(74) *Attorney, Agent, or Firm* — Womble Bond Dickinson (US) LLP

(57) ABSTRACT

A camera and a display panel are disposed on a same side of a terminal. The camera includes a lens barrel and a plurality of lenses disposed in the lens barrel in a stacked manner in a direction of an optical axis of the camera. The lens barrel includes a first segment housing a first lens, wherein the first lens includes a light incident surface, a light exiting surface, and a side surface connected between the light incident surface and the light exiting surface. The side surface includes a first surface and a second surface connected to the first surface, wherein a perpendicular distance between the first surface and the optical axis is less than a perpendicular distance between the second surface and the optical axis. A part of the first segment is disposed adjacent to the display panel to reduce a space occupied by the camera.

20 Claims, 11 Drawing Sheets

(51) Int. Cl.
*G02B 5/00* (2006.01)
*H04N 5/225* (2006.01)

(52) U.S. Cl.
CPC ........ *H04M 1/0266* (2013.01); *H04N 5/2254* (2013.01); *H04N 5/2257* (2013.01)

(58) Field of Classification Search
CPC .. H04M 1/0264; H04M 1/0266; H04M 1/026; H04M 1/02; H04M 1/0202; H04N 5/2254; H04N 5/2257
USPC .......................................................... 359/809
See application file for complete search history.

(56) References Cited

U.S. PATENT DOCUMENTS

| | | | |
|---|---|---|---|
| 2013/0287383 A1 | 10/2013 | Haruguchi et al. | |
| 2014/0092298 A1* | 4/2014 | Kim ...................... | G03B 17/02 348/374 |
| 2017/0078543 A1* | 3/2017 | Lee ...................... | H04N 5/2328 |
| 2017/0150055 A1* | 5/2017 | Chung ................ | H04N 5/2254 |
| 2017/0324892 A1* | 11/2017 | Kim ...................... | H04N 5/2252 |
| 2017/0351164 A1* | 12/2017 | Kim ...................... | H04N 5/2254 |
| 2017/0357144 A1* | 12/2017 | Kim ........................ | G03B 9/06 |
| 2019/0174032 A1* | 6/2019 | Yang .................... | G02B 7/021 |

FOREIGN PATENT DOCUMENTS

| | | | | | |
|---|---|---|---|---|---|
| CN | 201352268 | Y | | 11/2009 | |
| CN | 204578622 | U | | 8/2015 | |
| CN | 106161897 | A | | 11/2016 | |
| CN | 106997083 | A | * | 8/2017 | ............. G02B 7/021 |
| CN | 106997083 | A | | 8/2017 | |
| CN | 107302653 | A | | 10/2017 | |
| CN | 107357021 | A | | 11/2017 | |
| CN | 107395944 | A | | 11/2017 | |
| CN | 107682617 | A | | 2/2018 | |
| CN | 207135184 | U | | 3/2018 | |
| CN | 107872610 | A | | 4/2018 | |
| CN | 107907961 | A | | 4/2018 | |
| CN | 108076272 | A | | 5/2018 | |
| CN | 108196351 | A | | 6/2018 | |
| CN | 207543218 | U | | 6/2018 | |
| CN | 108429834 | A | | 8/2018 | |
| CN | 108429834 | A | * | 8/2018 | .......... H04M 1/0266 |
| JP | 11337707 | A | * | 12/1999 | ............. G02B 5/005 |
| JP | H11337707 | A | | 12/1999 | |
| JP | 2011064737 | A | | 3/2011 | |
| JP | 2015176016 | A | * | 10/2015 | ............. G02B 5/003 |
| JP | 2016038462 | A | | 3/2016 | |
| JP | 2016038462 | A | * | 3/2016 | ............... G02B 7/02 |
| KR | 20060102466 | A | | 9/2006 | |
| KR | 20120116092 | A | * | 10/2012 | ............. G03B 15/05 |
| KR | 20120116092 | A | | 10/2012 | |
| KR | 101724426 | B1 | | 4/2017 | |
| KR | 20170065955 | A | * | 6/2017 | ............. G02B 7/021 |
| KR | 20170112790 | A | * | 10/2017 | ............. G03B 29/00 |

* cited by examiner

CAMERA AND TERMINAL

CROSS-REFERENCE TO RELATED APPLICATIONS

This application is a national stage of International Application No. PCT/CN2018/108020, filed on Sep. 27, 2018, which is hereby incorporated by reference in its entirety.

TECHNICAL FIELD

This application relates to the field of camera technologies of a terminal, and specifically, to a camera and a terminal.

BACKGROUND

With development of terminals, such as a smartphone, in a structural design of a narrow bezel and a bezel-less screen, a front-facing camera needs to be reserved, and space occupied by the front-facing camera needs to be compressed as much as possible. Therefore, a smaller structure size of a camera is required as much as possible.

In a design in which a size of a camera, the size of the camera is reduced, and a vendor proposes to reduce a wall thickness of a lens barrel, a diameter of a lens, and the like, to achieve a size reduction effect to some extent. This application focuses on further compressing the size of the camera, to reduce occupied space.

SUMMARY

To resolve the foregoing technical problem, this application provides a camera and a terminal. The camera has a small size, and can reduce occupied space.

According to a first aspect, a camera is provided. The camera and a display panel are disposed on a same side of a terminal. The camera includes a lens barrel and a plurality of lenses disposed in the lens barrel in a stacked manner in a direction of an optical axis of the camera, the lens barrel includes a first segment and a second segment that are arranged and connected to each other in the direction of the optical axis, a lens housed in the first segment is a first lens, the first lens includes a light incident surface, a light exiting surface, and a side surface connected between the light incident surface and the light exiting surface, the side surface includes a first surface and a second surface that are connected, a perpendicular distance between the first surface and the optical axis is less than a perpendicular distance between the second surface and the optical axis, a shape of the first segment matches a shape of the first lens, wherein a part, of the first segment, matching the first surface is disposed adjacent to the display panel, and a part of the second segment is disposed in a stacked manner with an edge of the display panel.

The perpendicular distance between the first surface of the first lens in the first segment of the lens barrel and the optical axis is set to be less than the perpendicular distance between the second surface and the optical axis, so that a structure of the first lens is an incomplete circle. Because the shape of the first segment matches the shape of the first lens, the display panel at a position, of the first segment, corresponding to the first surface may be disposed closer to the optical axis. In this way, a size of the camera is further reduced, and occupied space of the camera is reduced.

The first lens includes an optical effective area and a non-optical effective area disposed on a periphery of the optical effective area, and the perpendicular distance between the first surface and the optical axis is greater than or equal to a radius of the optical effective area. The first surface disposed on the first lens in an embodiment is located in the non-optical effective area. The non-optical effective area does not participate in imaging, and does not occupy a position of the optical effective area for imaging. This can ensure that a refraction path of light is complete, and imaging is not affected.

There are two or more first lenses, and the first surfaces of all the first lenses are flush with each other and coplanar. Two or more first lenses are disposed, and all the first lenses are flush with each other and coplanar. Therefore, a first surface of the first segment of the lens barrel that matches the first lens is a complete surface, so that the first segment is disposed adjacent to or even close to the display panel.

The first surface of the first lens is parallel to the optical axis. In this way, an end surface of the display panel may be disposed adjacent to or even close to an entire first surface of the first segment, to further help reduce the occupied space of the camera.

There is an included angle between the first surface of the first lens and the optical axis, and a range of the included angle is 1° to 10°, to facilitate camera manufacturing and assembly.

The side surface further includes a third surface, the third surface is disposed opposite to the first surface, the second surface is connected between the third surface and the first surface, and a perpendicular distance between the third surface and the optical axis is less than the perpendicular distance between the second surface and the optical axis. The third surface is disposed opposite to the first surface, and the third surface is also similar to the first surface. The perpendicular distance between the third surface and the optical axis is less than the perpendicular distance between the second surface and the optical axis, so that a perpendicular distance between a third surface that matches the third surface of the first segment of the lens barrel and the optical axis is less than a perpendicular distance between a second surface and the optical axis. When the camera is assembled to the terminal, the third surface is disposed adjacent to or even close to the middle frame, so that the size of the camera can be further compressed, to reduce the occupied space, and increase a size of the display panel.

The first surface and/or the third surface includes planes or arc surfaces.

The first surface and the third surface are symmetrically disposed in the optical axis. The first surface and the third surface are symmetrically disposed in the optical axis, so that a shape of the first surface and a shape of the third surface are the same, and the perpendicular distance between the first surface and the optical axis and the perpendicular distance between the third surface and the optical axis are the same, to facilitate manufacturing.

A first light shielding film is disposed on an inner wall of the first segment, and the first light shielding film is disposed adjacent to the first surface and/or the third surface of the first lens. The first light shielding film is disposed on the inner wall of the first segment, and the first light shielding film can shield light, to reduce impact of the light in the non-optical effective area on the optical effective area on the first surface and/or the third surface, and improve a light imaging effect.

Second light shielding films are disposed on the first surfaces and/or the third surfaces of all the first lenses. A function of the second light shielding film disposed on the first lens is similar to that of the foregoing embodiment in which the first light shielding film is disposed on the inner wall of the first segment. A difference lies in that the second light shielding film needs to be manufactured only on the first lens, so that a quantity of second light shielding films can be reduced, to reduce costs.

Surface roughness of the first surfaces and/or the third surfaces of all the first lenses is higher than surface roughness of the second surface. The surface roughness of the first surface and/or the third surface of the first lens is disposed higher than the surface roughness the second surface, to achieve a light shielding effect.

The first segment is made by using a dual-material injection molding process, a position, of the first segment, opposite to the first surface and/or the third surface is made of a flexible material, a position, of the first segment, opposite to the second surface is made of a rigid material, and the flexible material is elastic. In an embodiment, the occupied space of the camera may be further reduced.

A buffer material is further disposed on the flexible material of the first segment. When the terminal falls, the buffer material lessens an effect of falling of the terminal, to prevent the camera from colliding with the display panel or the middle frame and causing damage.

A connection part between the first segment and the second segment forms a step surface, and the step surface is configured to position the display panel.

There are five lenses housed in the lens barrel, and there are two or three first lenses housed in the first segment. Alternatively, there are six lenses housed in the lens barrel, and there are two or three first lenses housed in the first segment. Alternatively, there are seven lenses housed in the lens barrel, and there are three or four first lenses housed in the first segment.

According to a second aspect, an embodiment of this application further provides a terminal, including a display panel, a middle frame, and the camera according to any one of the embodiments of the first aspect. The display panel is disposed in space enclosed by the middle frame. The camera and the display panel are disposed on a same side, and a first segment of a lens barrel of the camera is disposed adjacent to the display panel.

The display panel is disposed adjacent to the first segment of the lens barrel. Because the first segment matches a shape of a first lens, and a perpendicular distance between a first surface of the first lens and an optical axis is less than a perpendicular distance between a second surface and the optical axis, so that a size of the first segment of the camera is reduced, and the display panel may be disposed closer to the middle frame. In this way, an area occupation ratio of the display panel on the terminal is increased, to facilitate implementation of a structure design of a narrow bezel and bezel-less screen.

A second segment of the lens barrel of the camera is disposed adjacent to the middle frame, and a first gap exists between the first segment and the middle frame. The second segment is disposed adjacent to or even close to the middle frame, so that the entire camera is closer to the middle frame, and the display panel may be disposed closer to the middle frame. This helps improve the screen-to-body ratio of the display panel.

A filler is disposed in the first gap, and the filler is configured to support the first segment. The filler may be disposed to support the first segment, so that the first segment is kept at a preset position. In addition, the filler may further have a buffering function. When the terminal falls, the first segment is supported by the filler to avoid a hard impact and avoid camera damage.

A spring is disposed on the middle frame, and the spring abuts against the first segment. The spring may also be configured to support the first segment. When the terminal falls, the spring is elastically deformed to lessen an effect of falling of the terminal for the first segment. In addition, the spring may further provide an electrical connection function. To be specific, the spring may connect static electricity on the camera to the middle frame to eliminate the static electricity, to prevent the image sensor from being affected by accumulation of the static electricity on the camera.

BRIEF DESCRIPTION OF DRAWINGS

FIG. 6b is a schematic diagram of a partial sectional structure of a B area in FIG. 6a;

DESCRIPTION OF EMBODIMENTS

To make the objectives, technical solutions, and advantages of the embodiments of this application clearer, the applicant first defines a few terms to facilitate the following description. "stacked" or "stacked arrangement" means a position relationship in which two or more elements (or layer structures) are arranged in an overlapping manner. Specifically, one of the elements is used as a reference plane, and orthographic projections of other elements on the reference plane at least partially overlap the element. The stacked arrangement includes a fully overlapping state, and certainly also includes a partially overlapping state. In the partially overlapping state, at least two elements are arranged in a staggered manner in a direction perpendicular to the reference plane, and a gap may be maintained between the at least two elements (or layer structures), or the at least two elements may be in contact with each other.

Figure 1A:
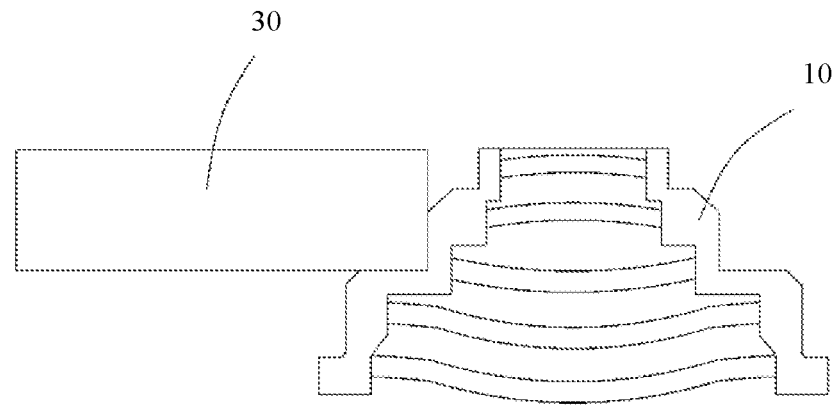
FIG. 1a is a schematic diagram of a structure of an existing camera and an existing display panel in the prior art.
Figure 1B:
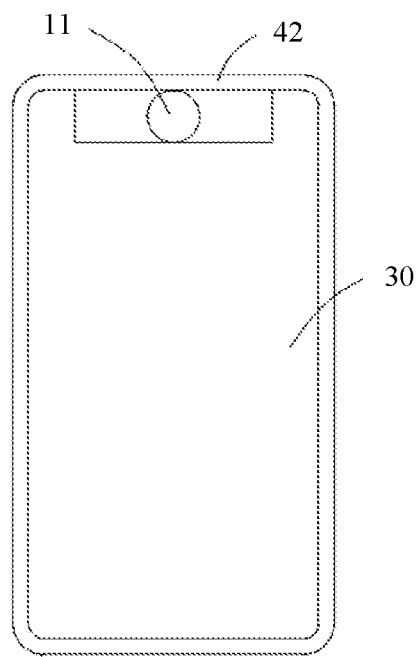
FIG. 1b is a schematic diagram of a structure of an existing terminal.
Figure 1C:
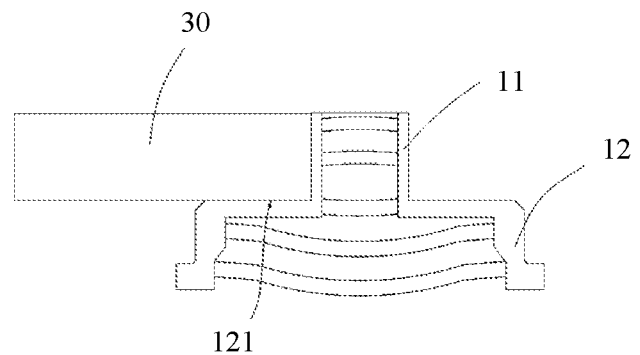
FIG. 1c is a schematic diagram of a structure of a camera and a display panel according to an embodiment.
Figure 1D:
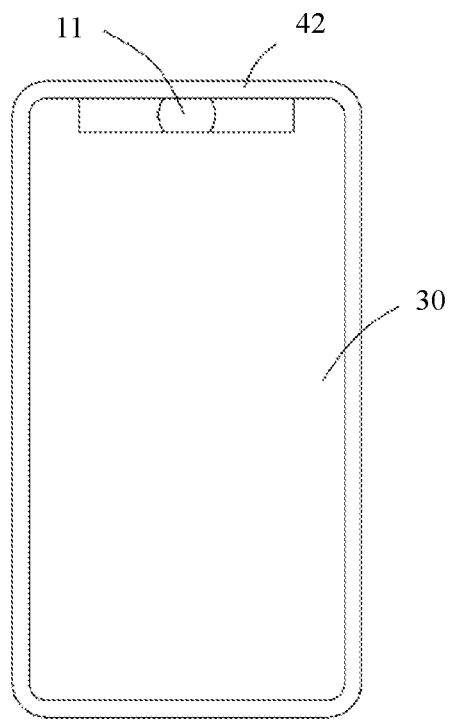
FIG. 1d is a schematic diagram of a structure of a terminal according to an embodiment.
Figure 1E:
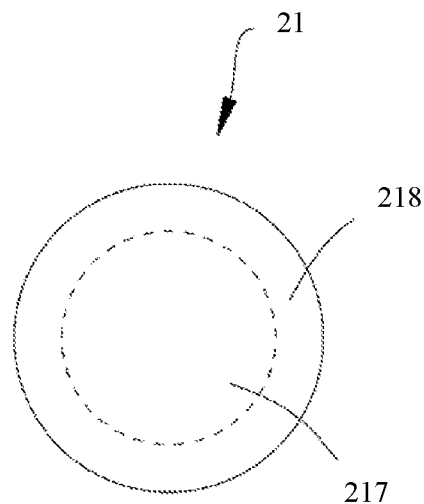
FIG. 1e is a schematic diagram of a structure of a first lens according to an embodiment.

Referring to FIG. 1a and FIG. 1b, in the prior art, a plurality of lenses of a camera are complete round lenses. When the lenses are disposed on a terminal, to increase a screen-to-body ratio as much as possible and reduce occupied space of the camera, a display panel 30 is disposed adjacent to or even close to a lens barrel, and a size of the camera needs to be reduced as much as possible. However, according to the research of the applicant, there is still design space for further improving the screen-to-body ratio in this design, and provided technical solutions is disclosed in this application. Referring to FIG. 1c and FIG. 1d, it can be seen that after the technical solutions of this application are used, the display panel 30 is closer to a middle frame 42 of a mobile terminal, and the occupied space of the camera is reduced, so that the screen-to-body ratio is improved. Before the technical solutions of this application are disclosed, a structure of a lens used by a camera is first described. Referring to FIG. 1e, a first lens 21 in an embodiment of this application is used as an example. The lens 21 usually includes an optical effective area 217 and a non-optical effective area 218. In an imaging process of the camera, an area in which light is refracted and imaged is the optical effective area, and the non-optical effective area 218 is usually set to provide an installation position for the optical effective area 217, and does not participate in imaging.

The following describes a technical solution of a camera in this application.

Referring to FIG. 1d, a camera provided in an embodiment of this application and a display panel 30 are disposed on a same side of a terminal. Specifically, referring to FIG. 2a, the camera includes a lens barrel 10 and a plurality of lenses disposed in the lens barrel 10 in a stacked manner in a direction of an optical axis A of the camera. The lens barrel 10 includes a first segment 11 and a second segment 12 that are arranged and connected to each other in the direction of the optical axis A, and a lens housed in the first segment 11 is a first lens 21. Referring to FIG. 2b, the first lens 21 includes a light incident surface 205, a light exiting surface 206, and a side surface connected between the light incident surface 205 and the light exiting surface 206. Referring to FIG. 2c, the side surface includes a first surface 201 and a second surface 202 that are connected, and a perpendicular distance L1 between the first surface 201 and the optical axis A is less than a perpendicular distance L2 between the second surface 202 and the optical axis A. Referring to FIG. 2d, a shape of the first segment 11 matches a shape of the first lens 21. With reference to FIG. 1c, a part, of the first segment 11, matching the first surface 201 is disposed adjacent to the display panel 30, and a part of the second segment 12 is arranged in a stacked manner with an edge of the display panel 30.

The perpendicular distance L1 between the first surface 201 of the first lens 21 in the first segment 11 of the lens barrel 10 and the optical axis A is set to be less than the perpendicular distance L2 between the second surface 202 and the optical axis A, so that a structure of the first lens 21 is an incomplete circle. Because the shape of the first segment 11 matches the shape of the first lens 21, the display panel 30 at a position, of the first segment 11, corresponding to the first surface 201 may be disposed closer to the optical axis A. In this way, a size of the camera is further reduced, and occupied space of the camera is reduced.

In an embodiment, a case in which the first segment 11 matches the first lens 21 may be as follows:

1. The first segment 11 has a same wall thickness, so that a structure shown in FIG. 2d can be implemented. To be specific, an outer wall of the first segment 11 includes a first surface 111 and a second surface 112 that are connected to each other, the first surface 111 corresponds to the first surface 201, and the second surface 112 corresponds to the second surface 202.

2. The wall thickness of the first segment 11 is different. A wall thickness at the first surface 111 corresponding to the first surface 201 is thinner than a wall thickness at the second surface 112 corresponding to the second surface 202, so that after the display panel 30 is disposed, the display panel 30 may be further closer to the optical axis A, to compress an overall size of the camera.

3. In the case 1 or 2, an inner wall of the first segment 11 and a periphery of the side surface of the first lens 21 are disposed close to each other, and the first surface 111 of the first segment 11 and an end surface of the display panel 30 are disposed close to each other, to further compress the overall size of the camera can be further.

4. In the case 1 or 2, the inner wall of the first segment 11 and the second surface 202 of the first lens 21 may be disposed close to each other, and there may be a gap between the inner wall of the first segment 11 and the first surface 201. An anti-glare structure may be disposed in the gap. This case is further described in subsequent embodiments.

5. In addition to the foregoing case, there may be another case. For example, the gap is disposed between the first surface 201 and the inner wall of the first segment 11, and a gap is disposed between the second surface 202 and the inner wall of the first segment 11. Alternatively, the wall thickness at the second surface 112 corresponding to the second surface 202 of the first segment 11 is thinner than the wall thickness at the first surface 111 corresponding to the first surface 201, and the like.

In an embodiment, the first surface 201 may be a plane or an arc surface, the second surface 202 is a circular arc surface, and the optical axis A is a straight line that passes through a center of the second surface 202. The first lens 21 is a convex lens or a concave lens, and the optical axis A is a normal of the convex lens or the concave lens. When the first surface 201 is the plane, the perpendicular distance L1 between the first surface 201 and the optical axis A is a length of a perpendicular line between a point passing through the optical axis A and the plane of the first surface 201. When the first surface 201 is the arc surface, the perpendicular distance L1 between the first surface 201 and the optical axis A is a length between the point that passes through the optical axis A and a point that is closest to the first surface 201 and that is one the first surface 201. Preferably, referring to FIG. 2e, when the first surface 201 is the arc surface, the arc surface is an elliptical surface, and the elliptical surface of the first surface 201 and the circular arc surface of the second surface 202 are smoothly transitioned to each other.

Referring to FIG. 1e and FIG. 2c, in an embodiment, the first lens 21 includes an optical effective area 217 and a non-optical effective area 218 disposed on a periphery of the optical effective area 217, and the perpendicular distance L1 between the first surface 201 and the optical axis A is greater than or equal to a radius of the optical effective area 217. In other words, the first surface 201 disposed on the first lens 21 in an embodiment is located in the non-optical effective area 218. The non-optical effective area 218 does not participate in imaging, and does not occupy a position of the optical effective area 217 for imaging. This can ensure that a refraction path of light is complete, and imaging is not affected. It should be understood that, when the perpendicular distance L1 between the first surface 201 and the optical axis A is equal to the radius of the optical effective area 217, the first surface 201 is tangent to a periphery of the optical effective area 217, which is a position, of the first surface 201, closest to the optical axis A.

Figure 2A:
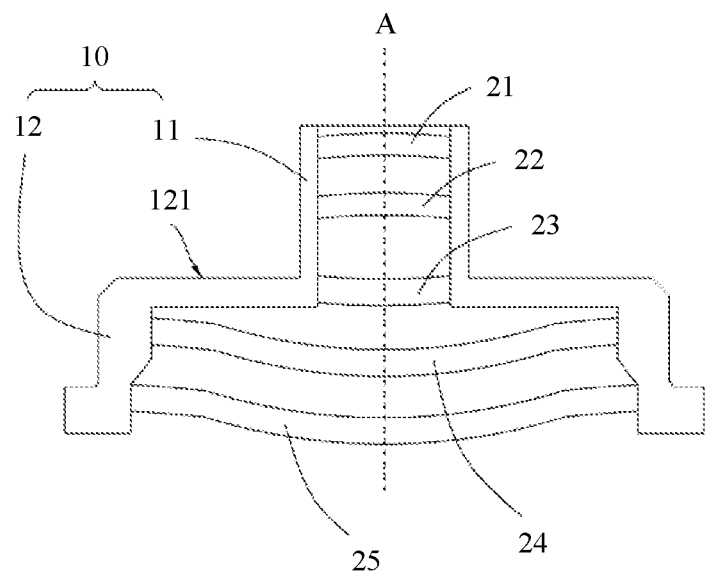
FIG. 2a is a schematic diagram of a sectional view structure of a camera according to an embodiment.
Figure 2B:
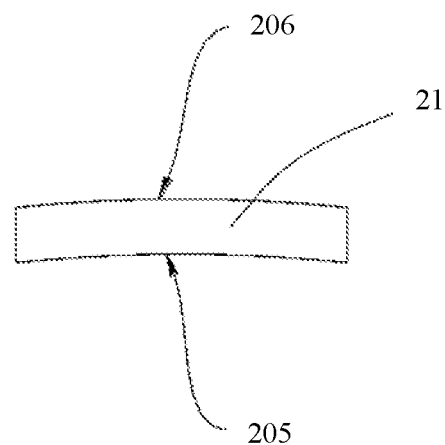
FIG. 2b is a schematic diagram of a sectional view structure of a first lens according to an embodiment.
Figure 2C:
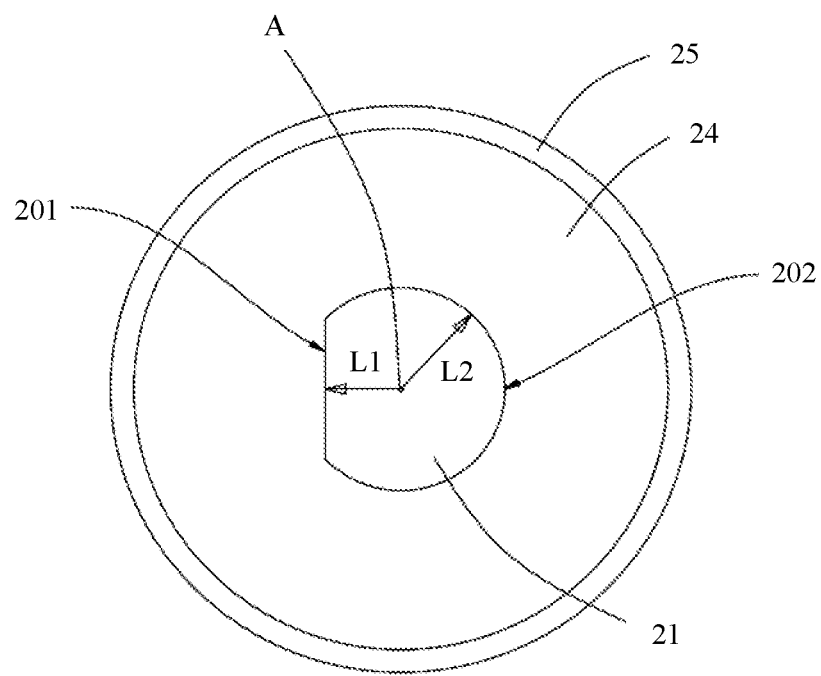
FIG. 2c is a schematic diagram of a structure of a plurality of lenses according to an embodiment.
Figure 2D:
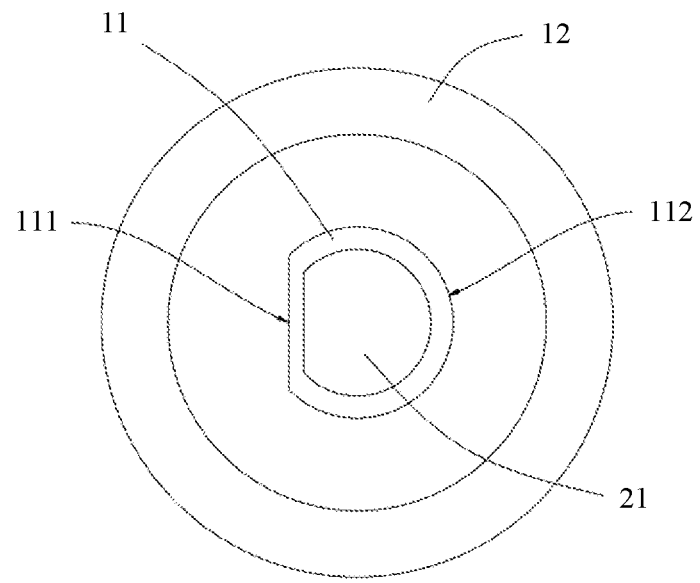
FIG. 2d is a schematic diagram of a structure in which the plurality of lenses in FIG. 2c are disposed in a lens barrel.
Figure 2E:
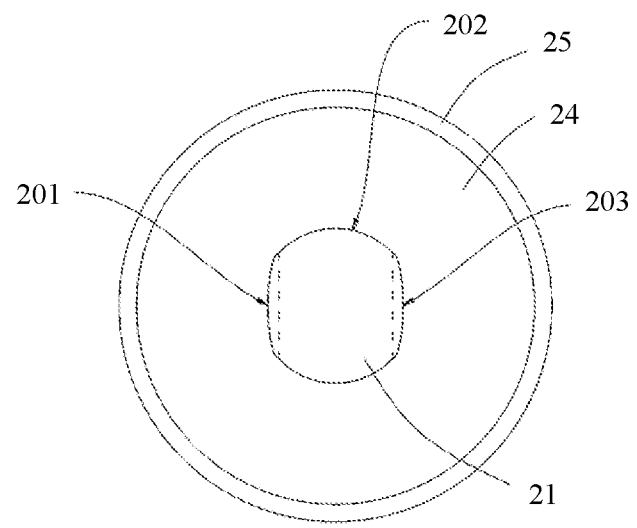
FIG. 2e is a schematic diagram of a structure of a plurality of lenses according to another embodiment.
Figure 2F:
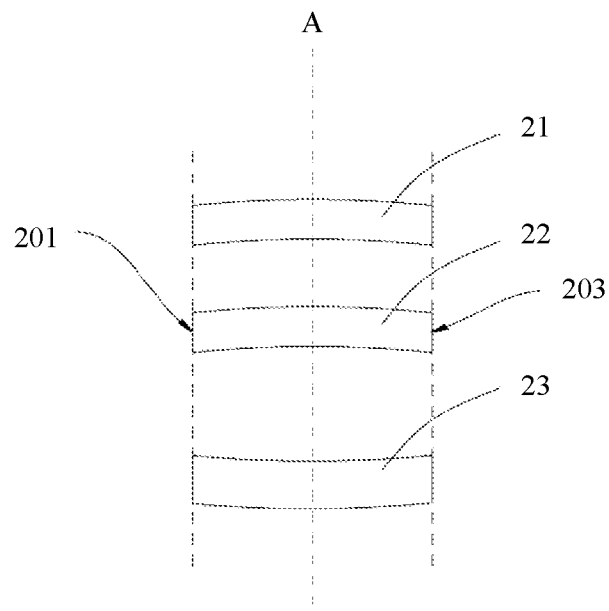
FIG. 2f is a schematic diagram of a sectional view structure of a first lens in a first segment according to an embodiment.

In an embodiment, referring to FIG. 2f, there are two or more first lenses 21, and first surfaces 201 of all the first lenses 21 are flush with each other and coplanar. For ease of description, three lenses (first lenses) are shown in the embodiment in FIG. 2f, and are respectively marked as a first lens 21, a second lens 22, and a third lens 23. Structures of the second lens 22 and the third lens 23 are similar to that of the first lens 21, and the first lens 21, the second lens 22, and the third lens 23 have a flush first surface 201. In an embodiment, the second lens 22 and the third lens 23 may have different degrees of concave and convexity, and may be set based on a light imaging requirement and a specific setting. This is not limited herein. Two or more first lenses 21 are disposed, and all the first lenses 21 are flush with each other and coplanar. Therefore, the first surface 111 of the first segment 11 of the lens barrel 10 that matches the first lens 21 is a complete surface, instead of a step-shaped structure in the prior art, so that the first segment 11 is disposed adjacent to or even close to the display panel 30.

In an embodiment, referring to FIG. 1c and FIG. 2a, the lens barrel 10 further includes the second segment 12 connected to the first segment 11, a connection part between the first segment 11 and the second segment 12 forms a step surface 121, and the step surface 121 is configured to position the display panel 30. Specifically, the first surface 111 of the first segment 11 is a complete surface, and the step surface 121 is also a complete surface. The first surface 111 and the step surface 121 form an included angle, and the included angle is preferably 90°. The display panel 30 is usually a plate structure. During disposing, the end surface of the display panel 30 is adjacent to or even close to the first surface 111, and a rear surface (namely, a surface away from the display surface) of the display panel 30 is adjacent to or even close to the step surface 121, to position the display panel 30.

In an embodiment, referring to FIG. 2d, there are five lenses housed in the lens barrel 10, and there are two or three first lenses 21 housed in the first segment 11 (there are three first lenses 21 shown in FIG. 2d, namely, the first lens 21, the second lens 22, and the third lens 23, and there are two lenses housed in the second segment 12, namely, a fourth lens 24 and a fifth lens 25). Alternatively, there are six lenses housed in the lens barrel 10, and there are two or three first lenses 21 housed in the first segment 11. Alternatively, there are seven lenses housed in the lens barrel 10, and there are three or four first lenses 21 housed in the first segment 11. In an embodiment, only an example is used to describe a quantity layout of lenses of the camera. Certainly, according to a specific structure of the camera, there may be another layout form.

In an embodiment, referring to FIG. 2f, the first surface 201 of the first lens 21 is parallel to the optical axis A. When there are two or more first lenses 21, first surfaces 201 of all the first lenses 21 that are flush with each other and coplanar are parallel to the optical axis A. The first surface 201 is disposed to be parallel to the optical axis A, so that after the first segment 11 of the lens barrel 10 matches all the first lenses 21, the first surface 111 of the first segment 11 is also parallel to the optical axis A. However, the end surface of the display panel 30 is usually a plane perpendicular to the display surface, so that the end surface of the display panel 30 may be disposed adjacent to or even close to an entire first surface 111 of the first segment 11, to further help reduce occupied space of the camera.

Figure 2G:
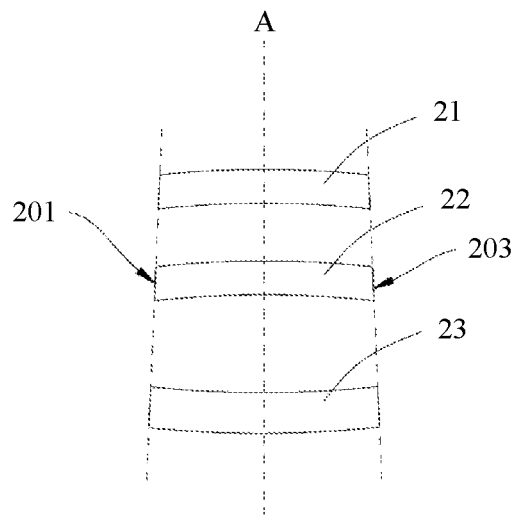
FIG. 2g is a schematic diagram of a sectional view structure of a first lens in a first segment according to another embodiment.

In an embodiment, referring to FIG. 2g, there is an included angle between the first surface 201 of the first lens 21 and the optical axis A. When there are two or more first lenses 21, the first surfaces 201 of all the first lenses 21 that are flush with each other and coplanar have a same included angle with the optical axis A. A range of the included angle may be 1° to 10°. Such setting is intended to facilitate manufacturing and assembly of the camera. Specifically, the included angle between the first surface 201 and the optical axis A is set to form a draft angle. When the first lens 21 and the first segment 11 of the lens barrel 10 are manufactured, a mold is disposed to have a same included angle. After the first lens 21 and the first segment 11 of the lens barrel 10 are manufactured on the mold, the first lens 21 and the first segment 11 of the lens barrel 10 are easily removed from the mold. In addition, during camera assembly, the first lens 21 is easily disposed in the first segment 11.

Figure 3A:
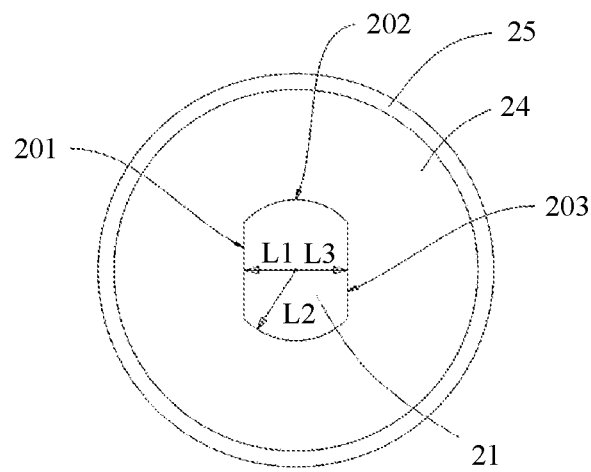
FIG. 3a is a schematic diagram of a structure of a plurality of lenses according to another embodiment.
Figure 3B:
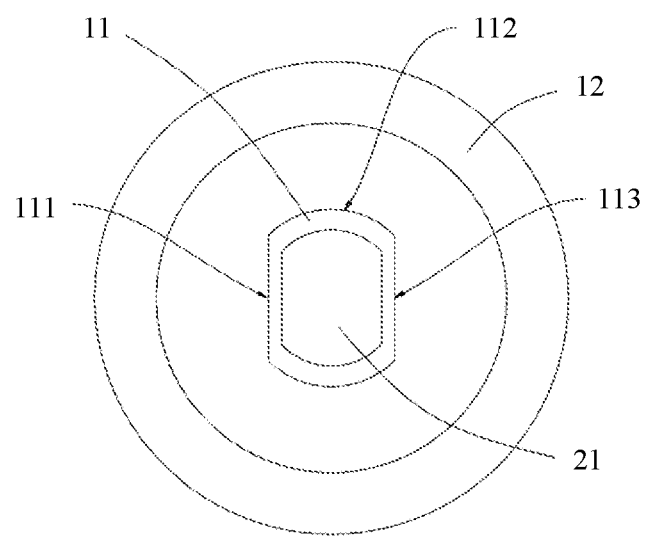
FIG. 3b is a schematic diagram of a structure in which the plurality of lenses in FIG. 3a are disposed in a lens barrel.

In an embodiment, referring to FIG. 3a and FIG. 3b, with reference to FIG. 1d, the side surface of the first lens 21 further includes a third surface 203. The third surface 203 is disposed opposite to the first surface 201, and the second surface 202 is connected between the third surface 203 and the first surface 201. A perpendicular distance L3 between the third surface 203 and the optical axis A is less than the perpendicular distance L2 between the second surface 202 and the optical axis A. The third surface 203 is disposed opposite to the first surface 201, and the third surface 203 is also similar to the first surface 201. The perpendicular distance L3 between the third surface 203 and the optical axis A is less than the perpendicular distance L2 between the second surface 202 and the optical axis A, so that a perpendicular distance between a third surface 113 that matches the third surface 203 and that is of the first segment 11 of the lens barrel 10 and the optical axis A is less than a perpendicular distance between the second surface 112 and the optical axis A. When the camera is assembled to the terminal, the third surface 113 is disposed adjacent to or even close to the middle frame 42, to further compress the size of the camera, and reduce the occupied space, so that a size of the display panel 30 may be further increased.

Similar to the first surface 201, the perpendicular distance L3 between the third surface 203 and the optical axis A is greater than or equal to the radius of the optical effective area 217. When there are two or more first lenses 21, third surfaces 203 of all the first lenses 21 are flush with each other and coplanar. The third surface may also be a plane or an arc surface.

In an embodiment, referring to FIG. 2f and FIG. 2g, the first surface 201 and the third surface 203 are symmetrically disposed in the optical axis A. The first surface 201 and the third surface 203 shown in the embodiment in FIG. 2f may be centro-symmetrically disposed, or may be mirror-symmetrically disposed. The first surface 201 and the third surface 203 shown in the embodiment of FIG. 2g are mirror-symmetrically disposed. Therefore, in an embodiment, the first surface 201 and the third surface 203 are symmetrically disposed with respect to the optical axis A, so that a shape of the first surface 201 and a shape of the third surface 203 are the same, and the perpendicular distance L1 between the first surface 201 and the optical axis A and the perpendicular distance L3 between the third surface 203 and the optical axis A are the same, to facilitate manufacturing.

In an imaging process of the camera, a flare (flare) phenomenon often occurs. After research, the foregoing problem is mainly caused after light in the non-optical effective area 218 of an optical lens enters the optical effective area 217. To avoid the flare phenomenon, this application provides some embodiments.

Figure 4A:
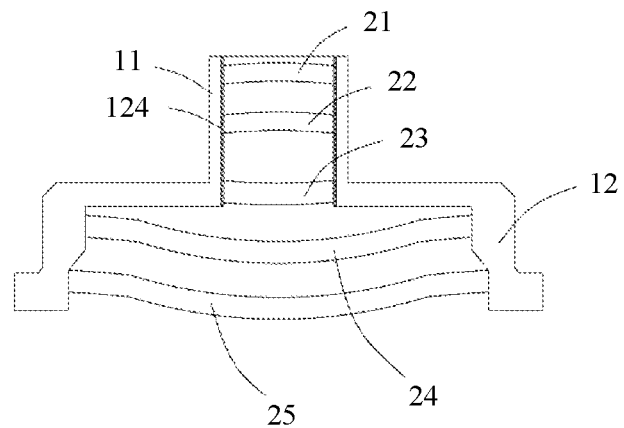
FIG. 4a is a schematic diagram of a sectional view structure of a camera according to an embodiment.

In an embodiment, referring to FIG. 4a, a first light shielding film 124 is disposed on the inner wall of the first segment 11. In an embodiment, the first light shielding film 124 is disposed adjacent to the first surface 201 of the first lens 21. In another embodiment, the first light shielding film 124 is disposed adjacent to the first surface 201 and the third surface 203 of the first lens 21. Although the non-optical effective area 218 does not participate in imaging, if light passes through the non-optical effective area 218, light in the optical effective area 217 is also interfered with to some extent. Therefore, the first light shielding film 124 is disposed on the inner wall of the first segment 11, and the first light shielding film 124 can shield light, to reduce impact of the light in the non-optical effective area 218 on the optical effective area 217 on the first surface 201 and/or the third surface 203, and improve a light imaging effect.

Specifically, the first light shielding film 124 may be a coating coated on the inner wall of the first segment 11, for example, a black coating coated by using a coating process, or a film layer structure pasted by using a pasting process, or a film layer structure made by using an electroplating process, or the like. When there are two or more first lenses 21, the first light shielding film 124 disposed on the inner wall of the first segment 11 covers positions of first surfaces 201 and/or third surfaces 203 of all the first lenses 21. Certainly, the first light shielding film 124 may completely cover all inner walls of the first segment 11.

Figure 4B:
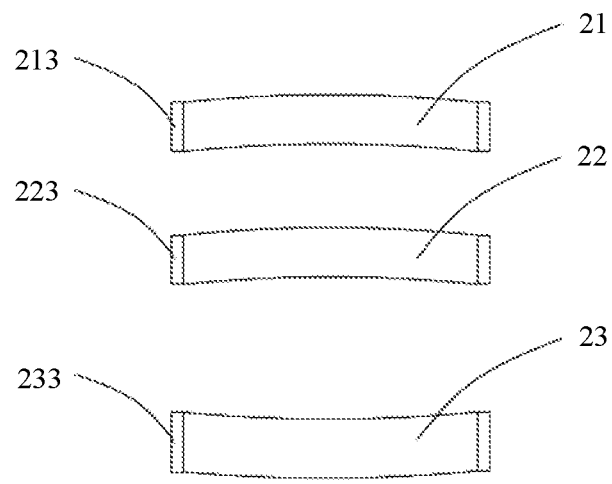
FIG. 4b is a schematic diagram of a sectional view structure of a first lens in a first segment according to an embodiment.

In an embodiment, referring to FIG. 4b, second light shielding films 213 are disposed on the first surfaces 201 and/or the third surfaces 203 of all the first lenses 21. In an embodiment, the second light shielding film 213 is disposed on the first surface 201 of the first lens 21. In another embodiment, the second light shielding film 213 is disposed on the first surface 201 and the third surface 203 of the first lens 21. When there are a plurality of first lenses 21, for ease of description, in the embodiment of three lenses shown in FIG. 4b, similar to the first lens 21, a second light shielding film 223 is also disposed on the first surface 201 and/or the third surface 203 of the second lens 22. A second light shielding film 233 is also disposed on the first surface 201 and/or the third surface 203 of the third lens 23. In an embodiment, the second light shielding film 213 is disposed on the first lens 21, and a function of the second light shielding film 213 is similar to that in the foregoing embodiment in which the first light shielding film 214 is disposed on the inner wall of the first segment 11. A difference lies in that, in an embodiment, the second light shielding film 213 is disposed on the first lens 21. Compared with manufacturing the first light shielding film 214 on the inner wall of the first segment 11, the second light shielding film 213 needs to be manufactured only on the first lens 21, so that a quantity of second light shielding films 213 can be reduced, to reduce costs. A process of manufacturing the second light shielding film 213 on the first lens 21 is similar to a process of manufacturing the first light shielding film 214, and reference may be made to the process of manufacturing the first light shielding film 214.

In an embodiment, referring to FIG. 2c, FIG. 2f, and FIG. 3a, surface roughness of the first surfaces 201 and/or the third surfaces 203 of all the first lenses 21 is higher than surface roughness of the second surface 202. Specifically, in the embodiment in FIG. 2c, the surface roughness of the first surface 201 of the first lens 21 is higher than the surface roughness of the second surface 202. In the embodiment in FIG. 3a, the surface roughness of the first surface 201 and the third surface 203 of the first lens 21 is higher than the surface roughness of the second surface 202. Because the first lens 21 is usually made of a glass material or a resin material, roughness of a surface of the first lens 21 is improved to form a structure similar to frosted glass, to achieve a light shielding effect. Therefore, in an embodiment, the surface roughness of the first surface 201 and/or the third surface 203 of the first lens 21 is disposed higher than the surface roughness the second surface 202, to achieve the light shielding effect.

Figure 4C:
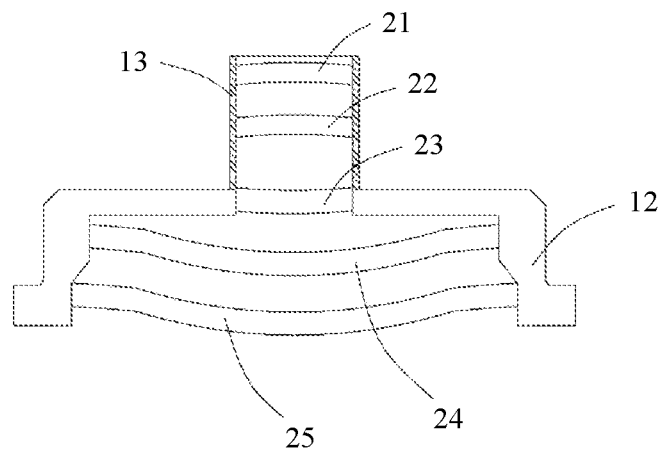
FIG. 4c is a schematic diagram of a sectional view structure of a camera according to an embodiment.

To further reduce the occupied space of the camera, in an embodiment, referring to FIG. 4c and with reference to FIG. 2c or FIG. 3a, the first segment 11 is made by using a dual-material injection molding process, a position, of the first segment 11, opposite to the first surface 201 and/or the third surface 203 is made of a flexible material 13, a position, of the first segment 11, opposite to the second surface 202 is made of a rigid material, and the flexible material 13 is elastic.

In an embodiment, a part of the rigid material of the first segment 11 is used to support the first lens 21, and a part of the flexible material 13 is elastic and can be elastically telescopic, so that the part of the flexible material 13 can be tightly attached to the first lens 21, to further reduce occupied space of the first segment 11 of the lens barrel 10. In addition, the flexible material 13 may be a light shielding film, to provide a light shielding function for the first lens 21.

In an embodiment, a buffer material is further disposed on the flexible material 13 of the first segment 11. The buffer material may be a structure such as foam. When the terminal falls, the foam lessens an effect of falling of the terminal, to prevent the camera from colliding with the display panel 30 or the middle frame 42 and causing damage.

Figure 5:
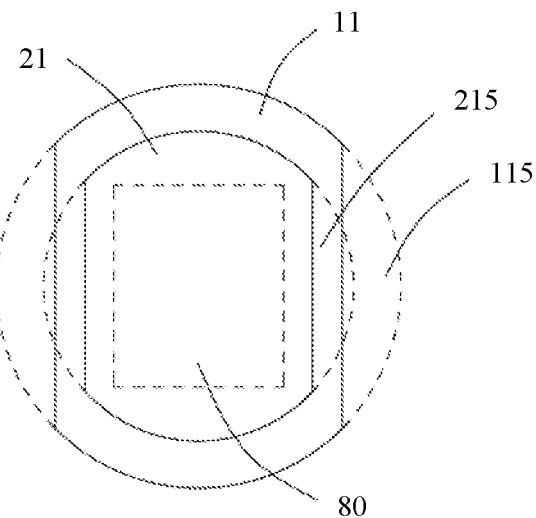
FIG. 5 is a schematic diagram of a structure of a first segment of a camera before and after machining according to an embodiment.

Referring to FIG. 5, with reference to FIG. 2c or FIG. 3a, a manufacturing process of the first lens 21 in an embodiment of this application may be a cutting process. A complete circular first lens 21 may be first provided, and the first surface 201 and/or the third surface 203 are/is obtained through cutting. A cut-off part is marked 215. The first segment 11 of the lens barrel 10 may be made by using a casting process, to form a shape that matches the first lens 21. Compared with a circular first segment 11, the first segment 11 of an embodiment is obtained through cutting. A cut-off part is marked 115 in FIG. 5. A finally formed first lens 21 includes an imaging area 80. The imaging area 80 corresponds to a shape of an image sensor of a CCD or a CMOS disposed behind the camera, and is usually a rectangle.

Referring to FIG. 6a to FIG. 6d, an embodiment of this application further provides a terminal, including a display panel 30, a middle frame 42, and the camera described in various embodiments of this application. The display panel 30 is disposed in space enclosed by the middle frame 42. The camera and the display panel 30 are disposed on a same side, and a first segment 11 of a lens barrel 10 of the camera is disposed adjacent to the display panel 30.

In an embodiment, the display panel 30 is disposed adjacent to the first segment 11 of the lens barrel 10. Because the first segment 11 matches a shape of a first lens 21, and a perpendicular distance L1 between a first surface 201 of the first lens 21 and an optical axis A is less than a perpendicular distance L2 between a second surface 202 and the optical axis A, so that a size of the first segment 11 of the camera is reduced, and the display panel 30 may be disposed closer to the middle frame 42. In this way, an area occupation ratio (a screen-to-body ratio) of the display panel 30 on the terminal is increased, to facilitate implementation of a structure design of a narrow bezel and bezel-less screen.

Figure 6A:
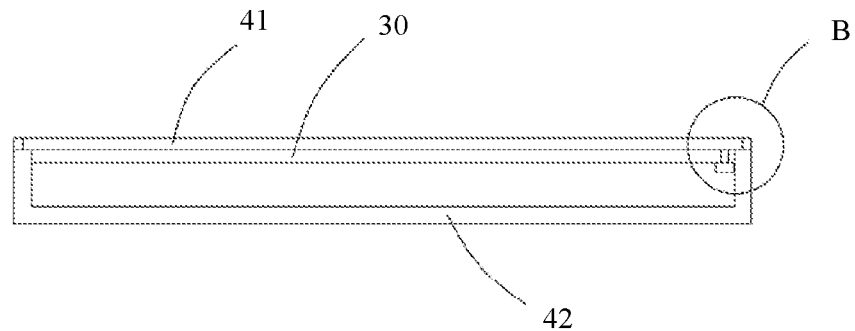
FIG. 6a is a schematic diagram of a sectional view structure of a terminal according to an embodiment.
Figure 6B:
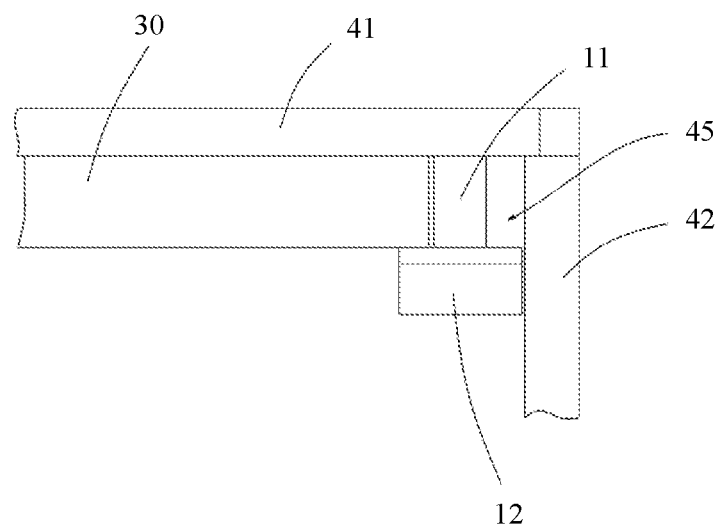

In an embodiment, referring to FIG. 6b, a second segment 12 of the lens barrel 10 of the camera is disposed adjacent to the middle frame 42, and a first gap 45 exists between the first segment 11 and the middle frame 42. Preferably, the second segment 12 and the middle frame 42 are disposed close to each other. In an embodiment, the second segment 12 is disposed adjacent to or even close to the middle frame 42, so that the entire camera is closer to the middle frame 42, and the display panel 30 may be disposed closer to the middle frame 42. This helps improve the screen-to-body ratio of the display panel 30.

Figure 6C:
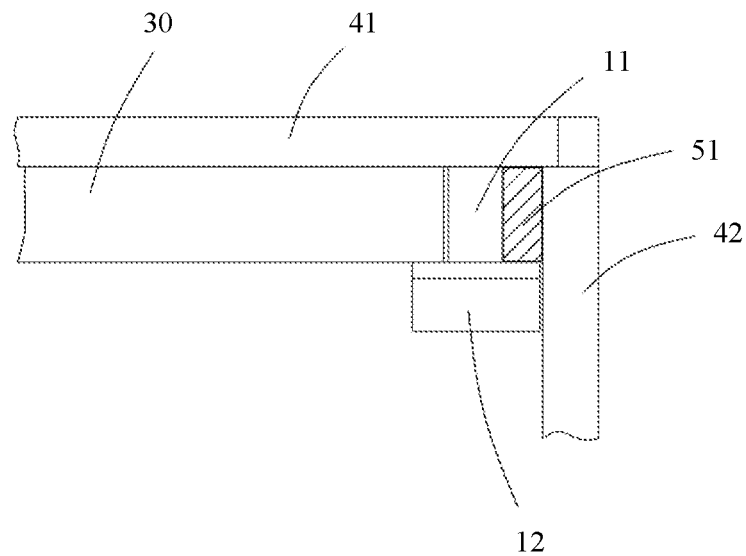
FIG. 6c is a schematic diagram of a structure of an embodiment in FIG. 6b.

In an embodiment, referring to FIG. 6b and FIG. 6c, a filler 51 is disposed in the first gap 45, and the filler 51 is configured to support the first segment 11. In an embodiment, the filler 51 may be disposed to support the first segment 11, so that the first segment 11 is kept at a preset position. In addition, the filler 51 may further have a buffering function. When the terminal falls, the first segment 11 is supported by the filler 51 to avoid a hard impact and avoid camera damage. The filler 51 may also be foam or the like.

Figure 6D:
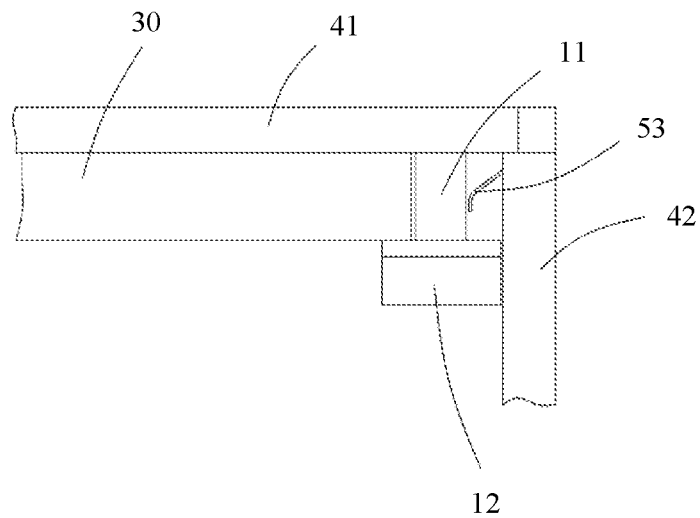
FIG. 6d is a schematic diagram of a structure of another embodiment in FIG. 6b.

Referring to FIG. 6b and FIG. 6d, a spring 53 is disposed on the middle frame 42, and the spring 53 abuts against the first segment 11. In an embodiment, the spring 53 may also be configured to support the first segment 11. When the terminal falls, the spring 53 is elastically deformed to lessen an effect of falling of the terminal for the first segment 11. In addition, the spring 53 may further provide an electrical connection function. To be specific, the spring 53 may connect static electricity on the camera to the middle frame to eliminate the static electricity, to prevent the image sensor from being affected by accumulation of the static electricity on the camera.

In FIG. 6a to FIG. 6d, a protection panel 41 is further disposed on the terminal. Preferably, the protection panel 41 is glass, and has good transparency, strength, and rigidity.

The terminal in an embodiment of this application may be a mobile terminal, such as a smartphone, a tablet computer, a mobile assistant, or a portable notebook computer, or certainly, may be a fixed terminal, such as an automatic teller machine or a display. In the embodiment of the smartphone shown in FIG. 1b and FIG. 1d, by using the technical solutions in the embodiments of this application, after the size of the camera is reduced, the screen-to-body ratio of the display panel 30 of the smartphone is significantly increased, and effects of a narrow bezel and a bezel-less screen are better.

The camera and the terminal provided in the embodiments of this application are described in detail above. The principle and embodiment of this application are described herein through specific examples. The description about the embodiments of this application is merely provided to help understand the method and core ideas of this application. In addition, a person of ordinary skill in the art can make variations and modifications to this application in terms of the specific embodiments and application scopes according to the ideas of this application. Therefore, the content of specification shall not be construed as a limit to this application.

What is claimed is:

1. A camera disposed on a same side of a terminal as a display panel, comprising:
a lens barrel; and
a plurality of lenses disposed in the lens barrel in a stacked manner in a direction of an optical axis of the camera, wherein the lens barrel comprises a first segment and a second segment that are arranged and connected to each other in the direction of the optical axis,
wherein a first lens housed in the first segment comprises a light incident surface, a light exiting surface, and a side surface connected between the light incident surface and the light exiting surface,
wherein the side surface comprises a first surface and a second surface that are connected, and a perpendicular distance between the first surface and the optical axis is less than a perpendicular distance between the second surface and the optical axis, and
wherein a shape of the first segment matches a shape of the first lens, wherein a part of the first segment matching the first surface is disposed adjacent to the display panel, and a part of the second segment is arranged in a stacked manner with an edge of the display panel.

2. The camera according to claim 1, wherein the first lens comprises an optical effective area and a non-optical effective area disposed on a periphery of the optical effective area, and the perpendicular distance between the first face and the optical axis is greater than or equal to a radius of the optical effective area.

3. The camera according to claim 2, further comprising two or more first lenses, and the first surface of the two or more first lenses are flush with each other and coplanar.

4. The camera according to claim 3, wherein the side face further comprises a third face, the third face is disposed opposite to the first face, the second face is connected between the third face and the first face, and a perpendicular distance between the third face and the optical axis is less than the perpendicular distance between the second face and the optical axis.

5. The camera according to claim 4, wherein the first face and the third face are symmetrically disposed in the optical axis.

6. The camera according to claim 1, wherein a first light shielding film is disposed on an inner wall of the first segment, and the first light shielding film is disposed adjacent to the first face and/or third face of the first lens.

7. The camera according to claim 1, wherein second light shielding films are disposed on the first faces and/or third faces of all the first lenses.

8. The camera according to claim 1, wherein surface roughness of the first faces and/or third faces of all the first lenses is higher than surface roughness of the second face.

9. The camera according to claim 1, wherein a part of the first segment, opposite to the first surface and/or the third surface comprises a flexible material, a part of the first segment opposite the second surface comprises a rigid material, and wherein the flexible material is elastic.

10. The camera according to claim 9, wherein a buffer material is further disposed on the flexible material of the first segment.

11. The camera according to claim 1, wherein a connection part between the first segment and the second segment forms a step face, and the step face is configured to position the display panel.

12. A terminal, comprising a display panel, a middle frame, and a camera, wherein the display panel is disposed in space enclosed by the middle frame, the camera and the display panel are disposed on a same side, and a first segment of a lens barrel of the camera is disposed adjacent to the display panel, wherein the camera comprises a lens barrel and a plurality of lenses disposed in the lens barrel in a stacked manner in a direction of an optical axis of the camera, the lens barrel comprises a first segment and a second segment that are arranged and connected to each other in the direction of the optical axis, a lens accommodated in the first segment is a first lens, the first lens comprises a light incident surface, a light exiting surface, and a side face connected between the light incident surface and the light exiting surface, the side face comprises a first face and a second face that are connected, a perpendicular distance between the first face and the optical axis is less than a perpendicular distance between the second face and the optical axis, a shape of the first segment matches a shape of the first lens, a part, of the first segment, cooperating with the first face is disposed adjacent to the display panel, and a part of the second segment is disposed in a stacked manner with an edge of the display panel.

13. The terminal according to claim 12, wherein a second segment of the lens barrel of the camera is disposed adjacent to the middle frame, and a first gap exists between the first segment and the middle frame.

14. The terminal according to claim 13, wherein a filler is disposed in the first gap, and the filler is configured to support the first segment.

15. The terminal according to claim 13, wherein a spring is disposed on the middle frame, and the spring abuts against the first segment.

16. The terminal according to claim 12, wherein the first lens comprises an optical effective area and a non-optical effective area disposed on a periphery of the optical effective area, and the perpendicular distance between the first surface and the optical axis is greater than or equal to a radius of the optical effective area.

17. The terminal according to claim 16, wherein the camera comprises two or more first lenses, and the first surfaces of the two or more first lenses are flush with each other and coplanar.

18. The terminal according to claim 17, wherein the side surface further comprises a third surface, wherein the third surface is disposed opposite to the first surface, wherein the second surface is connected between the third surface and the first surface, and a perpendicular distance between the third surface and the optical axis is less than the perpendicular distance between the second surface and the optical axis.

19. The terminal according to claim 18, wherein the first surface and the third surface are symmetrically disposed with respect to the optical axis.

20. The terminal according to claim 12, wherein a first light shielding film is disposed on an inner wall of the first segment, and the first light shielding film is disposed adjacent to the first surface and/or the third surface of the first lens.

* * * * *

UNITED STATES PATENT AND TRADEMARK OFFICE
CERTIFICATE OF CORRECTION

PATENT NO. : 11,297,175 B2
APPLICATION NO. : 17/280363
DATED : April 5, 2022
INVENTOR(S) : Weichih Lin and Zhe Peng It is certified that error appears in the above-identified patent and that said Letters Patent is hereby corrected as shown below:

In the Claims

In Claim 2, Column 12, Line 37-38, "the first face and optical axis" should be --between the first surface and the optical axis--.

In Claim 4, Column 12, Line 43-49, "wherein the side face further comprises a third face, the third face is disposed opposite to the first face, the second face is connected between the third face and the first face, and a perpendicular distance between the third face and the optical axis is less than the perpendicular distance between the second face and the optical axis." should be --wherein the side surface further comprises a third surface, wherein the third surface is disposed opposite to the first surface, wherein the second surface is connected between the third surface and the first surface, and a perpendicular distance between the third surface and the optical axis is less than the perpendicular distance between the second surface and the optical axis.--.

In Claim 5, Column 12, Line 50-53, "wherein the first face and the third face are symmetrically disposed in the optical axis." should be --wherein the first surface and the third surface are symmetrically disposed with respect to the optical axis.--.

In Claim 6, Column 12, Line 56, "the first face and/or third face of the first lens." should be --the first surface and/or the third surface of the first lens.--.

In Claim 7, Column 12, Line 58-59, "the first faces and/or third faces of all the first lenses." should be --the first surfaces and/or third surfaces of all the first lenses.--.

In Claim 8, Column 12, Line 60-62, "wherein surface roughness of the first faces and/or third faces of all the first lenses is higher than surface roughness of the second face." should be --wherein surface roughness of the first surfaces and/or the third surfaces of all the first lenses is higher than surface roughness of the second surface.--.

Signed and Sealed this
Sixth Day of September, 2022

*Katherine Kelly Vidal*

Katherine Kelly Vidal
*Director of the United States Patent and Trademark Office*

In Claim 11, Column 13, Line 5-7, "the second segment forms a step face, and the step face is configured to position the display panel." should be --the second segment forms a step surface, and the step surface is used to secure a position of the display panel.--.

In Claim 12, Column 13, Line 8-9, "a middle frame, and a camera," should be --a middle frame, and camera,--.

In Claim 13, Column 13, Line 31-32, "wherein a second segment of the lens barrel" should be --wherein the second segment of the lens barrel--.

In Claim 14, Column 14, Line 2-3, "and the filler is configured to support the first segment." should be --and the filler is used to support the first segment.--.